(12) United States Patent
Zhang (10) Patent No.: US 9,500,314 B2
(45) Date of Patent: Nov. 22, 2016

(54) STUDIO APPARATUS FOR MOUNTING PHOTOGRAPHY EQUIPMENT

(71) Applicant: Yi-Fei Zhang, Malden, MA (US)

(72) Inventor: Yi-Fei Zhang, Malden, MA (US)

(73) Assignee: Yifei Zhang, Bridgewater, MA (US)

( * ) Notice: Subject to any disclaimer, the term of this patent is extended or adjusted under 35 U.S.C. 154(b) by 226 days.

(21) Appl. No.: 14/510,270

(22) Filed: Oct. 9, 2014

(65) Prior Publication Data
US 2016/0102807 A1   Apr. 14, 2016

(51) Int. Cl.
*G03B 15/00* (2006.01)
*F16M 13/02* (2006.01)
*F16M 13/00* (2006.01)

(52) U.S. Cl.
CPC ............ *F16M 13/022* (2013.01); *F16M 13/00* (2013.01); *G03B 15/00* (2013.01)

(58) Field of Classification Search
CPC .... F16M 13/02; F16M 13/022; F16M 11/00; G03B 15/00

USPC ............................... 352/57, 44, 53, 243, 244
See application file for complete search history.

(56) References Cited

U.S. PATENT DOCUMENTS

| | | | |
|---|---|---|---|
| 3,952,322 A * | 4/1976 | Wolfe | G03B 15/02 362/11 |
| 5,857,119 A * | 1/1999 | Borden | G03B 15/00 396/428 |
| 8,526,802 B1 * | 9/2013 | Starns | G03B 17/561 248/464 |
| 2010/0232773 A1 * | 9/2010 | DePaula | G03B 15/00 396/5 |
| 2013/0222684 A1 * | 8/2013 | Mueller | F16M 11/18 348/373 |

* cited by examiner

*Primary Examiner* — William C Dowling (57) ABSTRACT

A studio apparatus for mounting photography equipment includes: an outer frame that defines a space and that is adapted for mounting a first group of the photography equipment thereon; an inner frame that is disposed in the space of the outer frame and that is adapted for mounting a second group of the photography equipment thereon; and a hoisting device for driving the inner frame to move upward and downward in the space.

13 Claims, 7 Drawing Sheets

STUDIO APPARATUS FOR MOUNTING PHOTOGRAPHY EQUIPMENT

FIELD OF THE INVENTION

This invention relates to a studio apparatus, more particularly to a studio apparatus for mounting photography equipment.

BACKGROUND OF THE INVENTION 3D stereoscopic photography and 3D printing have become a new technological trend, and more and more resources are put into the research and development for relevant software and hardware in the market. Images of an object from different angles must be recorded first before 3D printing can be carried out. The set of images can be processed by a 3D printer to print a corresponding 3D model. Since several video cameras are needed to photograph the object from different angles simultaneously, a studio apparatus that can dispose video cameras from various angles and that allows positions of the video cameras to be easily adjusted is needed in the market.

SUMMARY OF THE INVENTION

Therefore, an object of the present invention is to provide a studio apparatus for mounting photography equipment such that positions of the photography equipment can be easily adjusted.

According to the present invention, a studio apparatus for mounting photography equipment includes an outer frame that defines a space and that is adapted for mounting a first group of the photography equipment thereon, an inner frame that is disposed in the space of the outer frame and that is adapted for mounting a second group of the photography equipment thereon, and a hoisting device for driving the inner frame to move upward and downward in the space.

BRIEF DESCRIPTION OF THE DRAWINGS

Other features and advantages of the present invention will become apparent in the following detailed description of the embodiment of this invention, with reference to the accompanying drawings, in which.

DETAILED DESCRIPTION OF THE EMBODIMENT

Figure 1:
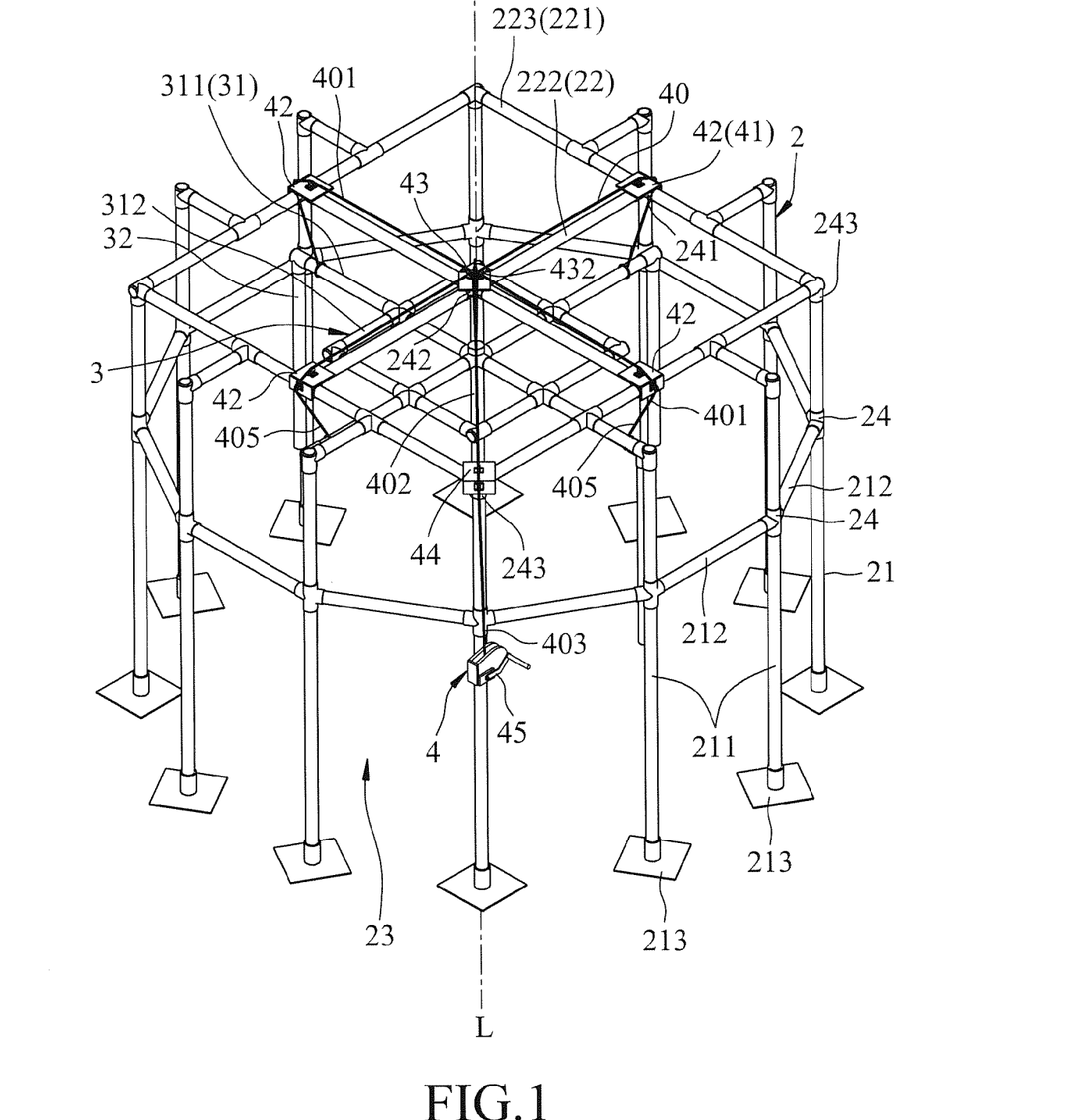
FIG. 1 is an assembled perspective view of the embodiment of a studio apparatus for mounting photography equipment according to the present invention.
Figure 2:
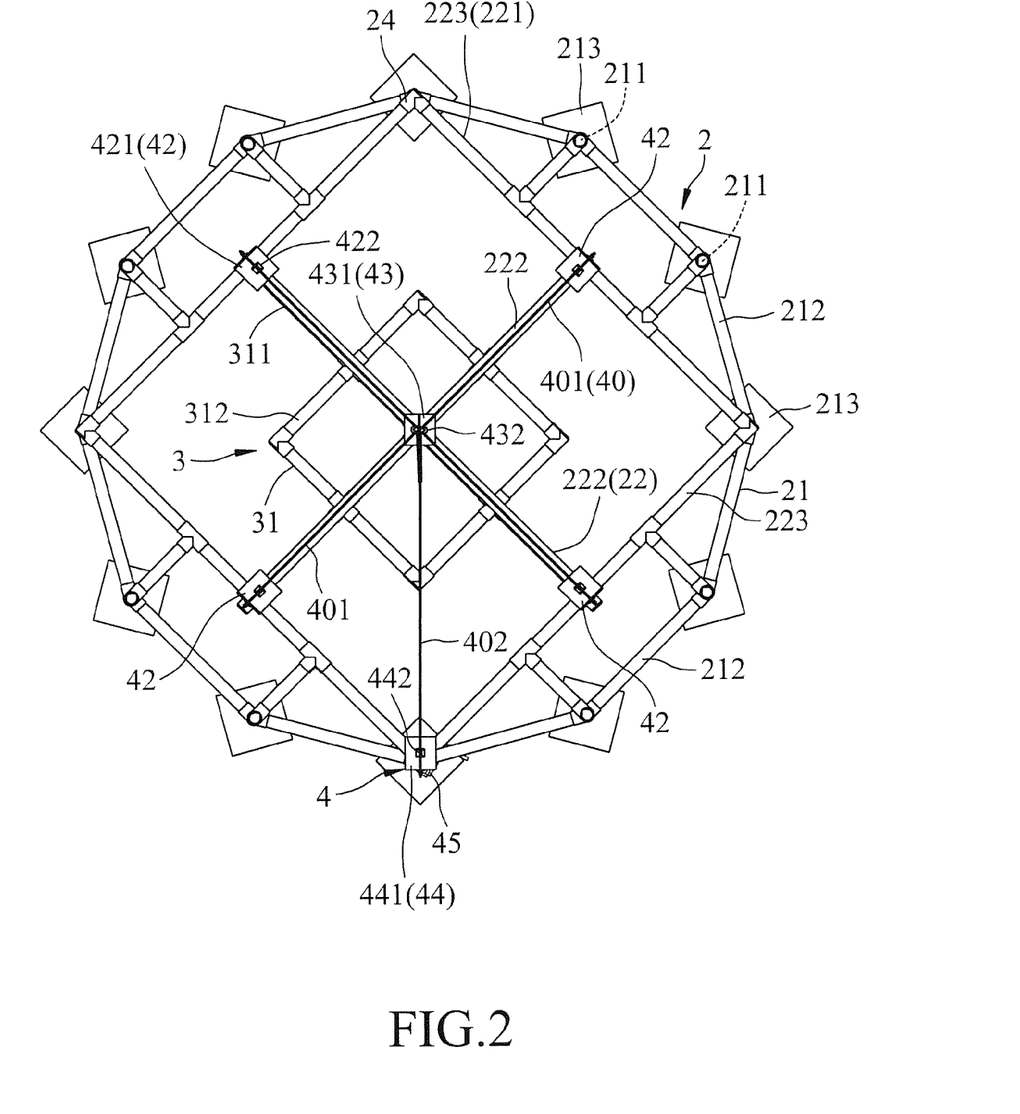
FIG. 2 is a top view of the embodiment.
Figure 3:
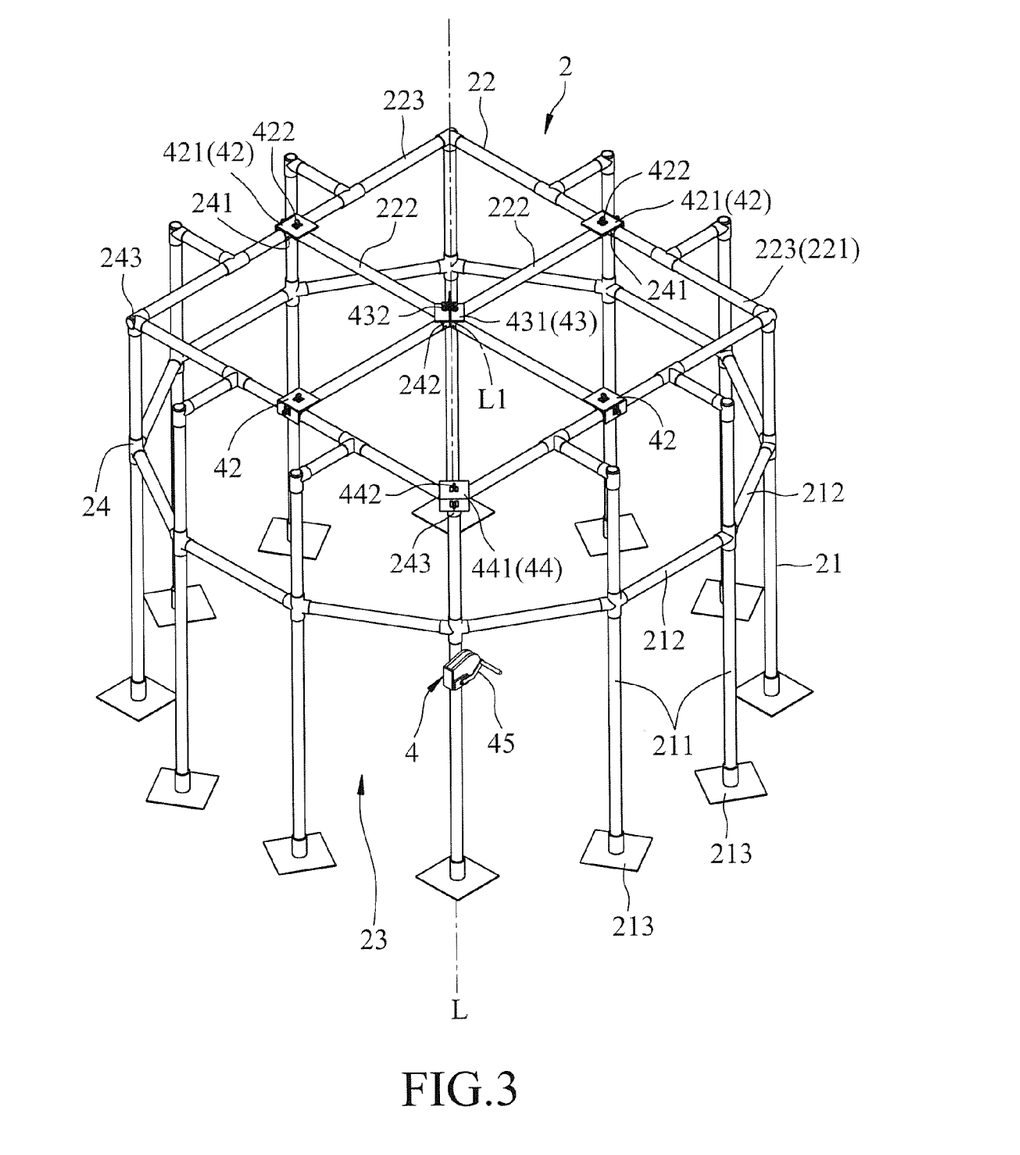
FIG. 3 is a perspective view of an outer frame of the embodiment.

Referring to FIGS. 1, 2 and 3, the embodiment of a studio apparatus for mounting photography equipment according to the present invention is shown to include an outer frame 2 that defines a space 23 and that is adapted for mounting a first group of the photography equipment thereon, an inner frame 3 that is disposed in the space 23 of the outer frame 2 and that is adapted for mounting a second group of the photography equipment thereon, and a hoisting device 4 for driving the inner frame 3 to move upward and downward in the space 23.

The outer frame 2 includes a top frame portion 22 and a supporting frame portion 21. The supporting frame portion 21 extends downward from an outer periphery of the top frame portion 22 and cooperates with the top frame portion 22 to define the space 23. A central axis (L) passing through a geometric center of the top frame portion 22 is defined. The supporting frame portion 21 has a plurality of supporting posts 211 that extend downward from the outer periphery of the top frame portion 22 and that are angularly spaced apart from one another, a plurality of tie rods 212 each interconnecting an adjacent pair of the supporting posts 211, and a plurality of foot stands 213 respectively coupled to bottom ends of the supporting posts 211. The top frame portion 22 has a plurality of mutually connected cross bars 221 and a center part (L1) located on the central axis (L).

In this embodiment, the supporting frame portion 21 includes twelve supporting posts 211, twelve tie rods 212, and twelve foot stands 213. The top frame portion 22 has eight cross bars 221. For clarification, the cross bars 221 are divided into four inner cross bars 222 and four outer cross bars 223. The inner cross bars 222 are surrounded by the outer cross bars 223. Each inner cross bar 222 has an end connected to the center part (L1) of the top frame portion 22, and an opposite end connected to a corresponding one of the outer cross bars 223. The outer cross bars 223 are interconnected end-to-end to constitute the outer periphery of the top frame portion 22 and are supported by the twelve supporting posts 211. In this embodiment, the outer frame 2 further includes a joint unit 24 for joining the supporting posts 211, the tie rods 212, and the cross bars 221. For clarification, the joint unit 24 includes four first joints 241 for interconnecting a corresponding inner cross bar 222 and a corresponding outer cross bar 223, a second joint 242 for interconnecting the ends of the inner cross bars 222 together, and four third joints 243 for interconnecting two adjacent ones of the outer cross bars 223.

Figure 4:
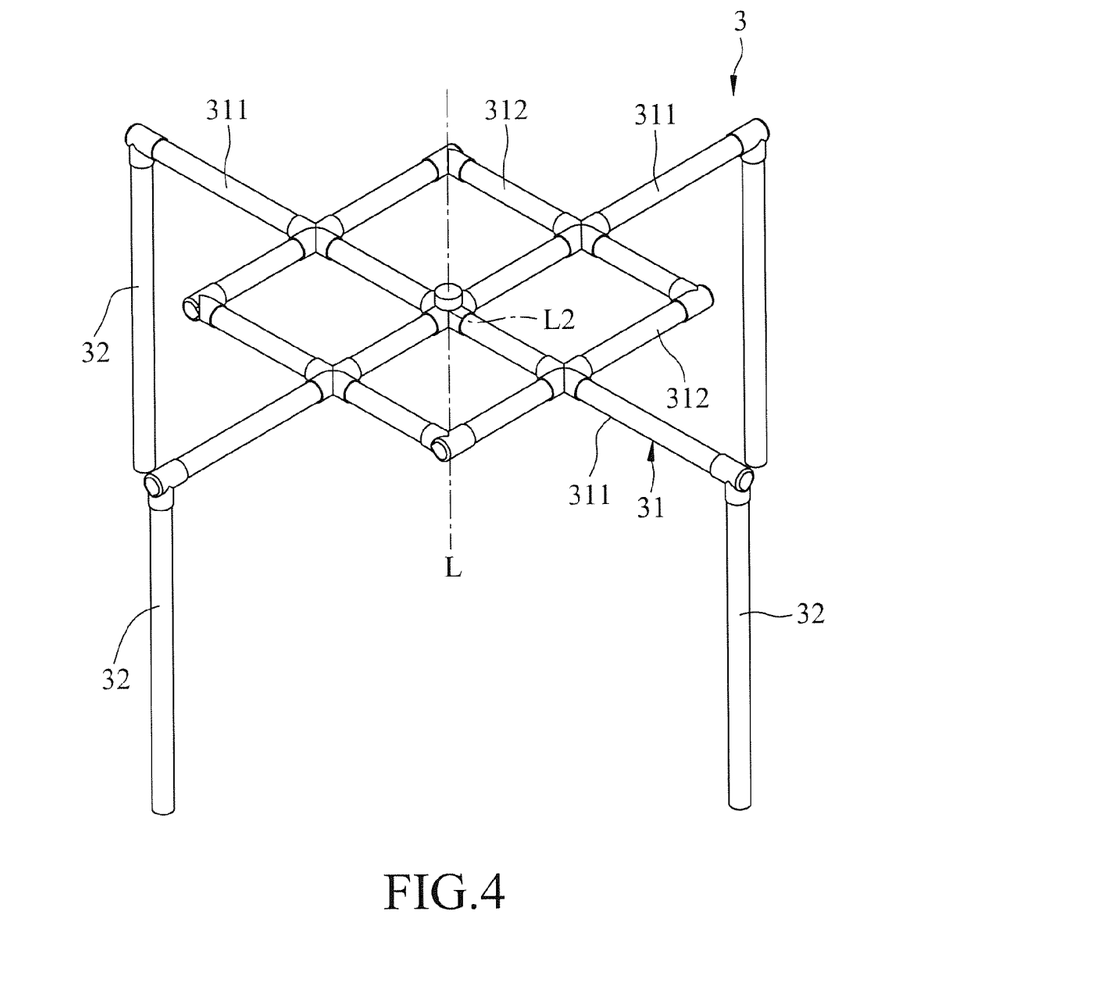
FIG. 4 is a perspective view of an inner frame of the embodiment.

Referring to FIGS. 1 and 4, the inner frame 3 includes a hanging portion 31 that is positioned under the top frame portion 22 of the outer frame 2, and four extending rods 32 that extend downward from the hanging portion 31 and that are disposed around the central axis (L) in an equiangular manner. The central axis (L) passes through a center of gravity of the inner frame 3. In this embodiment, the hanging portion 31 has four first rods 311 and four second rods 312. The first rods 311 are disposed around the central axis (L) in an equiangular manner. Each first rod 311 has one end thereof connected to a center part (L2) of the hanging portion 31 that is located on the central axis (L). The second rods 312 are L-shaped, and each of the second rods 312 interconnects two adjacent ones of the first rods 311 for firmly securing the four first rods 311. Each extending rod 32 is connected to the other end of a corresponding one of the first rods 311 and is substantially perpendicular to the corresponding one of the first rods 311.

Referring to FIGS. 1, 3, 5 and 6, the hoisting device 4 includes a cord unit 40, a guiding unit 41, and a winch 45. The winch 45 is disposed on the outer frame 2 and is for winding and unwinding the cord unit 40. In this embodiment, the winch 45 is mounted to a respective one of the supporting posts 211 of the supporting frame portion 21 of the outer frame 2 and is located under the third cord guide 44. In this embodiment, the winch 45 is operated manually.

The cord unit 40 is for hanging the inner frame 3 under the top frame portion 22 of the outer frame 2, is for driving the inner frame 3 to move upward and downward in the space 23, and includes a plurality of pulling cords 401 and a winch cord 402. The winch cord 402 has a first cord end 403 connected to the winch 45 and a second cord end 404 opposite to the first cord end 403. Each pulling cord 401 has a first end 405 that is connected to the hanging portion 31 of the inner frame 3, and a second end 406 that is opposite to the first end 405 and that is connected to the second cord end 404 of the winch cord 402 such that the inner frame 3 is hung under the top frame portion 22.

The guiding unit 41 is disposed on the top frame portion 22, guides the cord unit 40 to extend between the top frame portion 22 and the winch 45, and includes a plurality of first cord guides 42, a second cord guide 43, and a third cord guide 44. The first cord guides 42 are angularly spaced apart from one another. The second cord guide 43 is surrounded by the first cord guides 42. Extension of each of the pulling cords 401 between the inner frame 3 and the second cord end 404 of the winch cord 402 is guided by a corresponding one of the first cord guides 42 and by the second cord guide 43. In this embodiment, the second cord guide 43 is located on the center part (L1) of the top frame portion 22, and the first cord guides 42 are disposed around the second cord guide 43 in an equiangular manner. The third cord guide 44 guides extension of the winch cord 402 to the winch 45. In this embodiment, there are four of the pulling cords 401 respectively tied to the first rods 311 and four of the first cord guides 42 respectively guiding the pulling cords 401 to correspond to the first rods 311.

Figure 5:
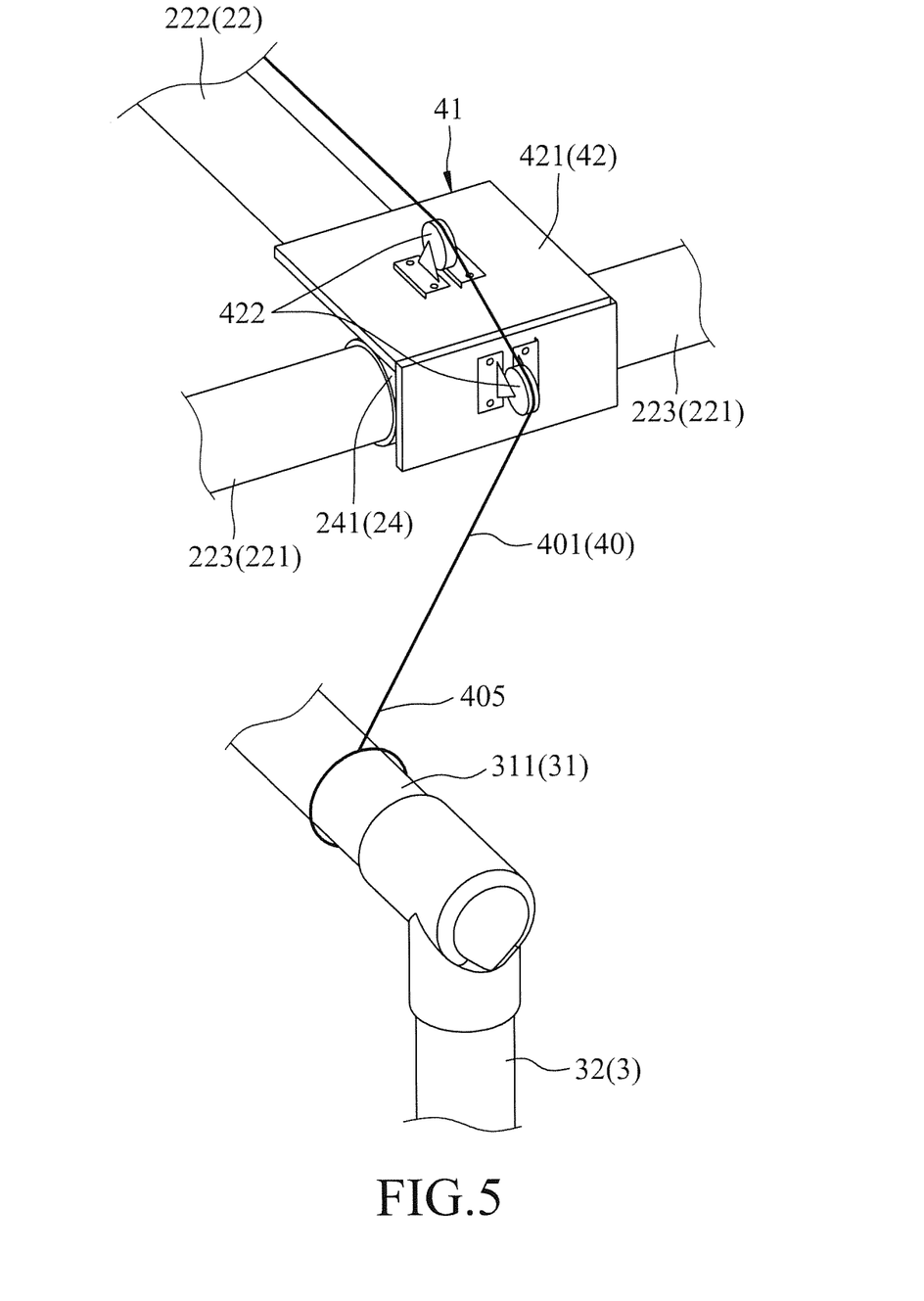
FIG. 5 is a fragmentary perspective view showing a first cord guide of the embodiment.

Referring to FIG. 5, each of the first cord guides 42 of the guiding unit 41 has a first base 421 that is mounted to the outer periphery of the top frame portion 22 and a first pulley set 422 that is mounted to the first base 421. To be more specific, in this embodiment, each first base 421 is mounted on a corresponding one of the first joints 241.

Figure 6:
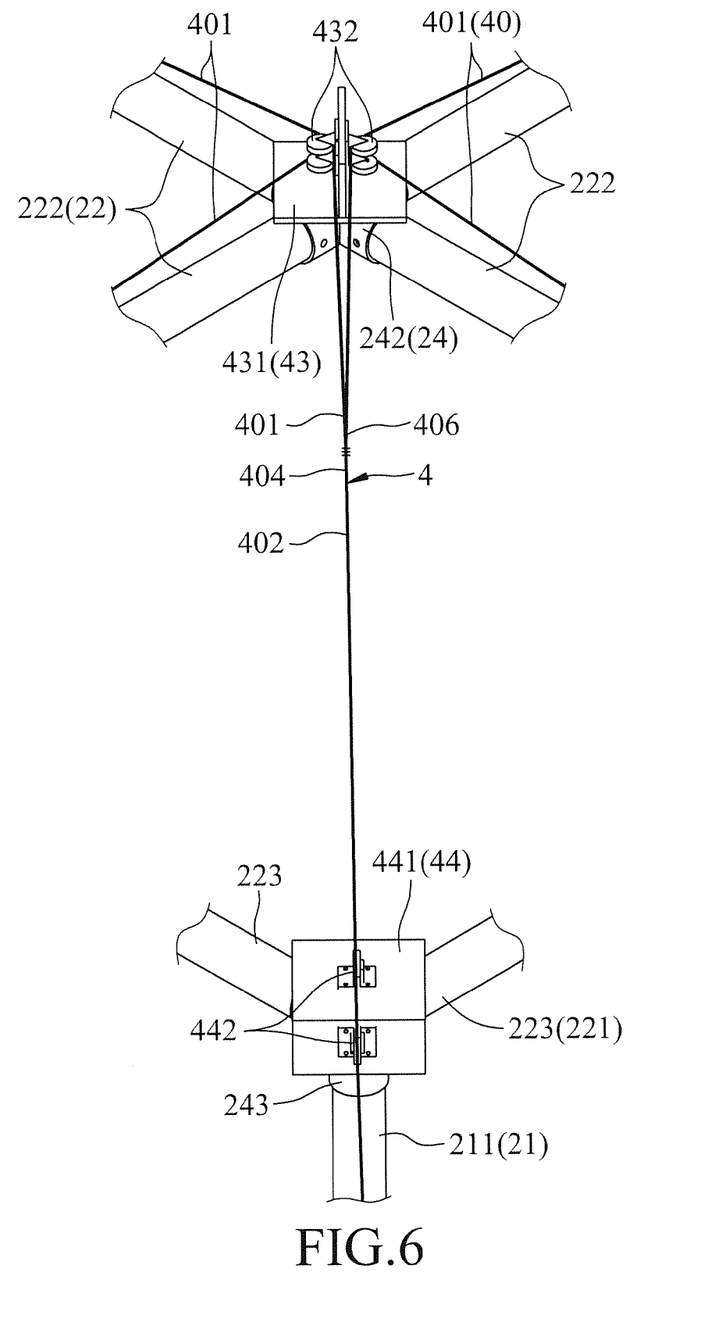
FIG. 6 is a fragmentary perspective view showing a second cord guide and a third cord guide of the embodiment.

Referring to FIG. 6, the second cord guide 43 has a second base 431 that is mounted to the center part (L1) of the top frame portion 22 and a second pulley set 432 that is mounted to the second base 431. The third cord guide 44 has a third base 441 that is mounted to the outer periphery of the top frame portion 22 and a third pulley set 442 that is mounted to the third base 441. To be more specific, in this embodiment, the second base 431 is mounted on the second joint 242, and the third base 441 is mounted on the third joint 243. The pulling cords 401 are guided by the first pulley sets 422 and the second pulley set 432. The winch cord 402 is guided by the third pulley set 442.

As mentioned above, extension of each of the pulling cords 401 between the inner frame 3 and the second cord end 404 of the winch cord 402 is guided by a corresponding one of the first cord guides 42 and the second cord guide 43. That is, the pulling cords 401 extend upward from the hanging portion 31 to the first cord guides 42 and further extend along the top frame portion 22 to the second cord guide 43. The second pulley set 432 of the second cord guide 43 guides the pulling cords 401 coming from different directions to extend to the second cord end 404 of the winch cord 402. The second cord end 404 of the winch cord 402 is fixedly connected to the second end 406 of the pulling cords 401. The winch cord 402 extends to the third cord guide 44 and further extends downward to and is received by the winch 45. This configuration allows the winch cord 402 to drive the pulling cords 401 to move simultaneously. As a result, the inner frame 3 can be driven to move upward and downward in the space 23 relative to the outer frame 2.

Figure 7:
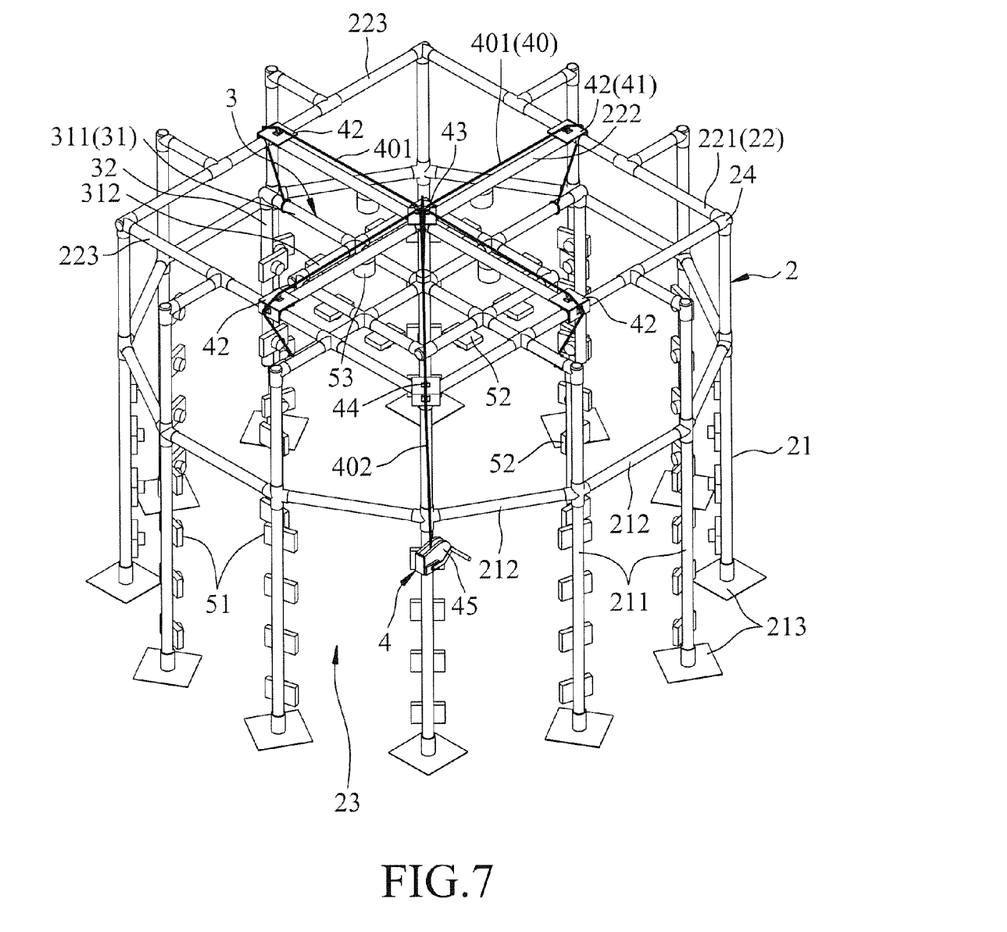
FIG. 7 is a perspective view illustrating the embodiment and a plurality of video cameras and a plurality of flash lamps mounted thereon.

FIG. 7 shows the first and second groups of the photography equipment respectively mounted on the outer and inner frames 2, 3. In this embodiment, the first group of the photography equipment includes a plurality of first video cameras 51 for recording and imaging purposes and a plurality of flash lamps 53, and the second group of the photography equipment includes a plurality of second video cameras 52 for recording and imaging purposes. The first video cameras 51 are mounted to the supporting frame portion 21 of the outer frame 2, the second video cameras 52 are mounted to the inner frame 3, and the flash lamps 53 are mounted to the top frame portion 22 of the outer frame 2. Positions and orientations of the first video cameras 51, the second video cameras 52 and the flash lamps 53 can be easily adjusted based on different demands.

Usually, the height of the outer frame 2 is about the height of an adult. Before photographing, an object (e.g., a model, a child, an article, etc.) is first disposed inside the space 23. The inner frame 3 is then adjusted to a proper height for the object to be photographed via the hoisting device 4. When a model is to be photographed, the height of the inner frame 3 can be adjusted such that the head of the model is surrounded by the second video cameras 52. In case of photographing a shorter adult or a child, the height of the inner frame 3 can be adjusted accordingly such that the head of the shorter adult or the child can be surrounded by the second video cameras 52 for a close photographic shooting of the head.

Consequently, advantages and merits of the present invention are as follows:

1. In the present invention, the hoisting device 4 is able to hoist the inner frame 3 to adjust the positions of the second video cameras 52. Therefore, the present invention is easy to operate and is capable of photographing different objects with different heights, so that errors caused by improper photography distances can be avoided, and the 3D images obtained by software computation from the photography results are less susceptible to distortion.
2. In the present invention, the capability of upward and downward movement of the inner frame 3 helps to meet specific photographic shooting requirements such as a focus on the head portion of a model, and helps to enhance the resolution and vividness of the photography results.
3. In the present invention, the outer frame 2 and the inner frame 3 have numerous rods, bars, and posts for mounting the first video cameras 51, the second video cameras 52, and the flash lamp 53 thereon. The assembling procedure of the rods, bars, and posts is easy, and the alignment and arrangement of the rods, bars, and posts can be changed easily. Moreover, since positions and orientations of the photography equipment are not limited to one configuration, the present invention has a wide range of applications.

To sum up, the present invention allows for mounting of the first video cameras 51 and the second video cameras 52 thereon, and positions of the second video cameras 52 can be easily adjusted through the hoisting device 4 to meet specific photographic shooting requirements.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A studio apparatus for mounting photography equipment, comprising:
    an outer frame that defines a space and that is adapted for mounting a first group of the photography equipment thereon;
    an inner frame that is disposed in said space of said outer frame and that is adapted for mounting a second group of the photography equipment thereon; and
    a hoisting device for driving said inner frame to move upward and downward in said space.

2. The studio apparatus as claimed in claim 1, wherein:
    said outer frame includes a top frame portion and a supporting frame portion that extends downward from an outer periphery of said top frame portion and that cooperates with said top frame portion to define said space; and
    said hoisting device includes a cord unit that is for hanging said inner frame under said top frame portion and for driving said inner frame to move upward and downward in said space.

3. The studio apparatus as claimed in claim 2, wherein said hoisting device further includes a winch that is disposed on said outer frame and that is for winding and unwinding said cord unit.

4. The studio apparatus as claimed in claim 3, wherein:
    said winch is mounted to said supporting frame portion of said outer frame; and
    said hoisting device further includes a guiding unit that is disposed on said top frame portion and that guides said cord unit to extend between said top frame portion and said winch.

5. The studio apparatus as claimed in claim 4, wherein:
    said cord unit includes a winch cord having a first cord end connected to said winch, and a second cord end opposite to said first cord end, and a plurality of pulling cords each having a first end that is connected to said inner frame, and a second end that is opposite to said first end and that is connected to said second cord end of said winch cord; and
    said guiding unit includes a plurality of first cord guides that are angularly spaced apart from one another, and a second cord guide that is surrounded by said first cord guides, wherein extension of each of said pulling cords between said inner frame and said second cord end of said winch cord is guided by a corresponding one of said first cord guides and by said second cord guide.

6. The studio apparatus as claimed in claim 5, wherein said guiding unit further includes a third cord guide that guides extension of said winch cord to said winch.

7. The studio apparatus as claimed in claim 6, wherein said second cord guide is located on a center part of said top frame portion, and said first cord guides are disposed around said second cord guide in an equiangular manner.

8. The studio apparatus as claimed in claim 7, wherein:
    each of said first cord guides has a first base that is mounted to said top frame portion and a first pulley set that is mounted to said first base;
    said second cord guide has a second base that is mounted to the center part of said top frame portion and a second pulley set that is mounted to said second base;
    said third cord guide has a third base that is mounted to said outer periphery of said top frame portion and a third pulley set that is mounted to said third base;
    said pulling cords are guided by said first pulley sets and said second pulley set; and
    said winch cord is guided by said third pulley set.

9. The studio apparatus as claimed in claim 2, wherein said inner frame includes a hanging portion that is positioned under said outer frame and that is connected to said cord unit, and a plurality of extending rods that extend downward from said hanging portion.

10. The studio apparatus as claimed in claim 2, wherein said supporting frame portion of said outer frame has a plurality of supporting posts that extend downward from said outer periphery of said top frame portion and that are angularly spaced apart from one another, and a plurality of tie rods each interconnecting an adjacent pair of said supporting posts.

11. The studio apparatus as claimed in claim 10, wherein said supporting frame portion of said outer frame further has a plurality of foot stands respectively coupled to bottom ends of said supporting posts.

12. The studio apparatus as claimed in claim 10, wherein said top frame portion has a plurality of mutually connected cross bars.

13. The studio apparatus as claimed in claim 5, wherein said second cord guide is located on a center part of said top frame portion, and said first cord guides are disposed around said second cord guide in an equiangular manner.

* * * * *